B. JONES & P. J. REES.
MEANS FOR PREVENTING THE RAISING OF DUST OF MOTOR VEHICLES.
APPLICATION FILED APR. 6, 1916.
1,216,131.
Patented Feb. 13, 1917.
2 SHEETS—SHEET 1.
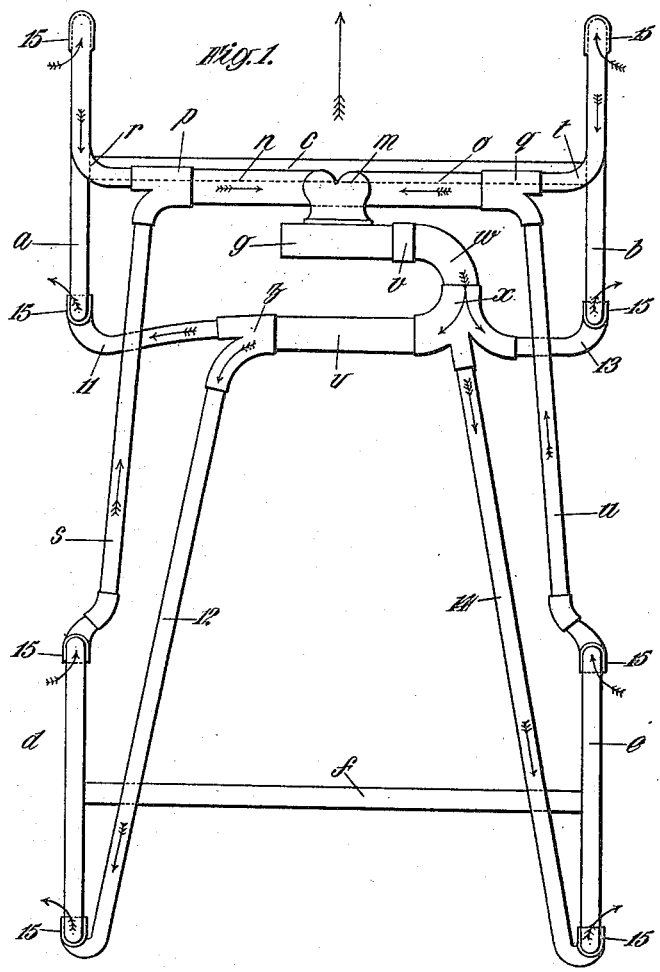
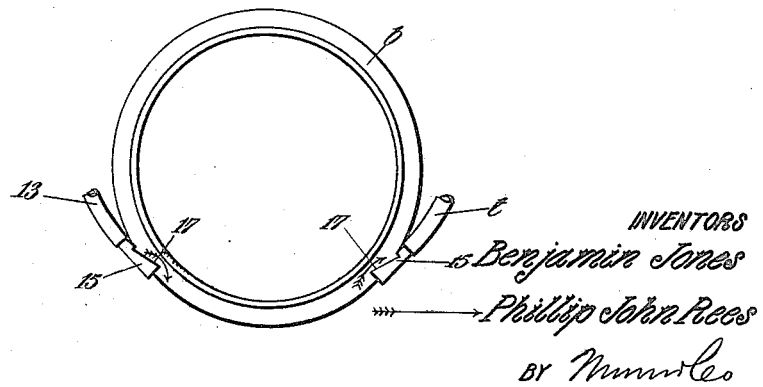
INVENTORS
Benjamin Jones
Phillip John Rees
BY
ATTORNEYS B. JONES & P. J. REES.
MEANS FOR PREVENTING THE RAISING OF DUST OF MOTOR VEHICLES.
APPLICATION FILED APR. 6, 1916.
1,216,131.
Patented Feb. 13, 1917.
2 SHEETS—SHEET 2.
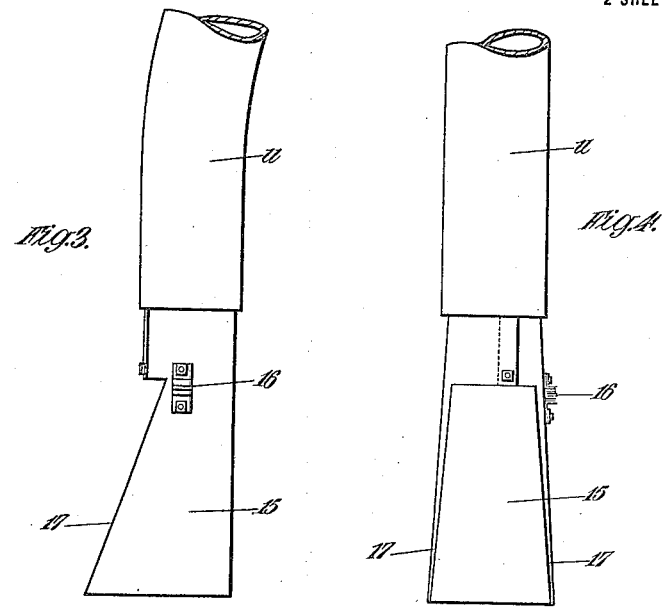
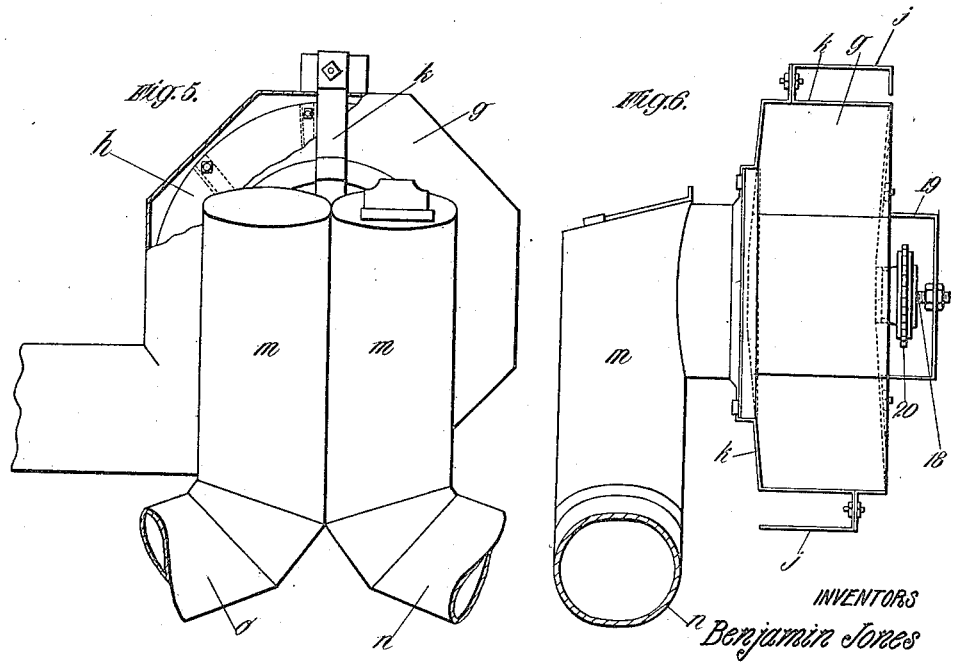
INVENTORS
Benjamin Jones
Phillip John Rees
BY
ATTORNEYS

UNITED STATES PATENT OFFICE.

BENJAMIN JONES AND PHILLIP JOHN REES, OF GWAUN-CAE-GURWEN, WALES.

MEANS FOR PREVENTING THE RAISING OF DUST BY MOTOR-VEHICLES.

1,216,131.  Specification of Letters Patent.  Patented Feb. 13, 1917.

Application filed April 6, 1916. Serial No. 89,379.

*To all whom it may concern:*

Be it known that we, BENJAMIN JONES, a subject of the King of Great Britain, and resident at 54 Gate street, Cwmgors Road, Gwaun - Cae - Gurwen, Glamorganshire, Wales, and PHILLIP JOHN REES, a subject of the King of Great Britain, and resident at post-office, Tairgwaith, Gwaun - Cae - Gurwen aforesaid, have invented certain new and useful Improvements in Means for Preventing the Raising of Dust by Motor-Vehicles, of which the following is a specification.

This invention relates to the prevention of dust raising by motor vehicles, and has for its object to provide means, which may be actuated by the motor of the vehicle, and serve to prevent the raising of dust by the vehicle wheels.

As is well known, the raising of dust by the wheels of a rapidly moving vehicle is largely due to the inward rush of air to fill the partial vacuum created by the rapid forward movement of the wheel as a whole, the vacuum being greatest in the space immediately behind the point of contact between the tread of the wheel and the ground, with the result that the air which rushes in gathers up from the surface of the road, and becomes laden with dust, which is thereafter carried upward by the vortex created by the rotation of the peripheral portion of the wheel in contact with the surrounding atmosphere.

The aim of the present invention is to nullify the tendency to create a partial vacuum behind the wheel, by the delivery of a counter-current of air.

The invention will be more fully described with reference to the accompanying drawings in which like characters indicate like parts in all the views and in which Figure 1 is a diagrammatic plan illustrating how the invention is applied to the wheels of a motor car, Fig. 2 is a side elevation illustrating the positions of the air-intake and delivery pipes relatively to a wheel, Figs. 3 and 4 are respectively a side elevation and a front elevation of the end of an air-delivery pipe, shown on an enlarged scale, and Figs. 5 and 6 are respectively a front elevation and an end elevation of a fan casing.

$a$ and $b$ are the front wheels mounted on an axle $c$, and $d$ and $e$ are the rear wheels mounted on an axle $f$ of a motor car of any well known construction which is not illustrated. $g$ is the casing of a fan $h$, said casing $g$ being connected with the frame of the vehicle by means of hooks $j, j$ formed in one with a strap $k$ secured to said casing. The casing $g$ has a duplex inlet pipe $m$ leading to the center of one side thereof and connected with flexible pipes $n, o$ which extend toward either side of the vehicle and are furnished with junction pieces $p, q$ whereof the junction piece $p$ is connected with two flexible pipes $r$ and $s$ leading to the front of the wheels $a$ and $d$ respectively, while the junction piece $q$ is connected with two flexible pipes $t$ and $u$ leading to the front of the wheels $b$ and $e$ respectively.

The casing $g$ has an outlet pipe $v$ connected by a flexible pipe $w$ with a junction piece $x$, connected on the one hand by a flexible pipe $y$ with another junction piece $z$, which is connected with flexible pipes 11 and 12 leading to the rear of the wheels $a$ and $d$ respectively, and connected on the other hand with flexible pipes 13 and 14 leading to the rear of the wheels $b$ and $e$ respectively.

Each of the flexible pipes $r, s, t, u$, 11, 12, 13 and 14 terminates in a mouth-piece 15 (see especially Figs. 3 and 4), said mouth-pieces being held adjacent to the peripheries of the corresponding wheels and close to the ground (see Fig. 2) by clamps 16 (Figs. 3 and 4) and suitable stays (not shown). Each mouth-piece 15 is formed with lateral wings 17 which are adapted to extend on either side of the peripheral portion of the wheel as shown in Fig. 2.

The fan $h$ runs on suitable ball bearings and its spindle 18 is supported at the inlet side of the fan by a spider frame (not shown) and at the other side of the fan by the strap $k$ which is offset as at 19 for this purpose, and said spindle has mounted thereon between said offset part of the strap $k$ and the casing $g$ a sprocket wheel 20 whereby the fan $h$ may be driven through a sprocket chain (not shown) from any suitable rotating part of the motor, or, if desired, the fan may be driven by an independent source of power such as an electric motor.

In use, the fan $h$ draws in air from the front of the wheels $a, b, d$ and $e$ through the pipes $r, s, t, u, n, o, m$, and delivers air through the pipes $w, y$, 11, 12, 13 and 14 to the corresponding mouth-pieces 15 whence the air issues at the peripheral portion of the wheel, i. e. adjacent to the tread and sides of the tire, as a counter-current to eddies there set up, so that the raising of dust by said eddies is prevented.

It is not essential that the air drawn in by the fan $h$ should be led from in front of the wheels $a$, $b$, $d$ and $e$, but this arrangement is found preferable as reduction of air pressure at said parts assists the prevention of dust raising.

What we claim is:—

1. In means for preventing the raising of dust by the wheels of a motor vehicle, the combination with a vehicle, of pipes having mouth pieces arranged in front and rear of the wheels adjacent the treads thereof and close to the ground, and an air apparatus connected with the said pipes and drawing in the air in front of the wheels and delivering it to the rear of the wheels.

2. Means for preventing the raising of dust by the wheels of motor vehicles, said means comprising the combination with a motor vehicle of a fan casing mounted on said vehicle, a fan in said casing, an air inlet to, and an air outlet from said fan casing, pipes connecting said inlet with mouth-pieces, said mouth-pieces being arranged in front of the road wheels of the vehicle, and pipes connecting said outlet with mouth-pieces, said second-named mouth-pieces being arranged in rear of the road wheels of the vehicle, said first-named and said second-named mouth-pieces being disposed adjacent the peripheries of the corresponding wheels and close to the ground.

3. Means for preventing the raising of dust by the wheels of motor vehicles, said means comprising the combination with a motor vehicle of a fan casing mounted on said vehicle, a fan in said casing, means for driving said fan, an air inlet to, and an air outlet from, said fan casing, junction pieces and flexible pipes connecting said inlet with inlet mouth-pieces, and junction pieces and flexible pipes connecting said outlet with outlet mouth-pieces, said inlet mouth-pieces being arranged in front of, and said outlet mouth-pieces being arranged in rear of, the road wheels of the vehicle, said inlet and outlet mouth-pieces being disposed adjacent the peripheries of the corresponding wheels and close to the ground and having lateral wings adapted to extend on either side of the peripheral portions of said wheels, substantially as set forth.

BENJAMIN JONES.
PHILLIP JOHN REES.

Copies of this patent may be obtained for five cents each, by addressing the "Commissioner of Patents, Washington, D. C."